United States Patent [19]

Yaeger et al.

[11] Patent Number: 4,996,617
[45] Date of Patent: Feb. 26, 1991

[54] DISC DRIVE SAFETY LATCH USING SHAPE MEMORY METALS

[75] Inventors: John R. Yaeger, Sunnyvale; Suzanne R. Wilkins, Capitola, both of Calif.

[73] Assignee: Seagate Technology, Inc., Scotts Valley, Calif.

[21] Appl. No.: 299,400

[22] Filed: Jan. 23, 1989

[51] Int. Cl.$^5$ .......................... G11B 5/54; G11B 21/22
[52] U.S. Cl. .................................................. 360/105
[58] Field of Search ........................ 360/105, 104, 106

[56] References Cited

U.S. PATENT DOCUMENTS

| 4,605,979 | 8/1986 | Inoue et al. | 360/105 |
| 4,679,102 | 7/1987 | Wevers et al. | 360/105 X |
| 4,845,579 | 7/1989 | Wikinson, Jr. | 360/106 |

Primary Examiner—David J. Severin
Attorney, Agent, or Firm—Flehr, Hohbach, Test, Albritton & Herbert

[57] ABSTRACT

A shape memory metal actuator latch is provided adjacent to a rotating disc within a data storage device for automatically locking the carriage arm in its storage position when power is removed from the drive. The carriage arm is provided with a pin or casting protrusion which normally slides against or past a flexible arm mounted adjacent the carriage arm. A shape memory metal wire is attached to the flexible arm adjacent its hinged point of rotation, i.e. adjacent a point at which the arm flexes under pressure. When the disc drive is operational, the shape memory wire has power applied thereto, heating the wire past its transformation point and causing a change in phase. The resulting force applied to the arm deforms the arm around the hinge point so that the pin on the carriage arm is freed from engagement with the locking arm. When disc drive power is removed, the carriage arm and the transducer it carries are returned to the safe storage landing zone, and the pin or post is captured by the arm which returns to its unbiased position upon the removal of power from the shape memory wire.

15 Claims, 3 Drawing Sheets

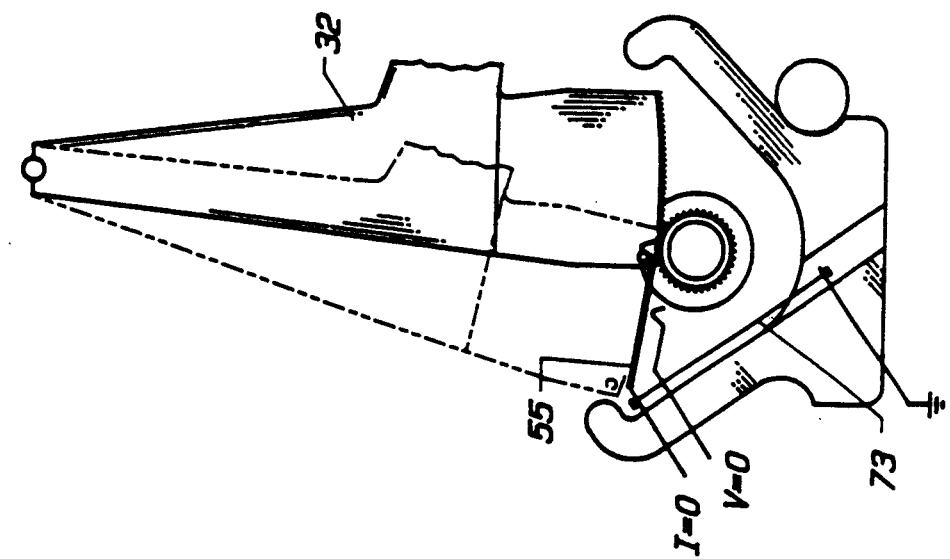
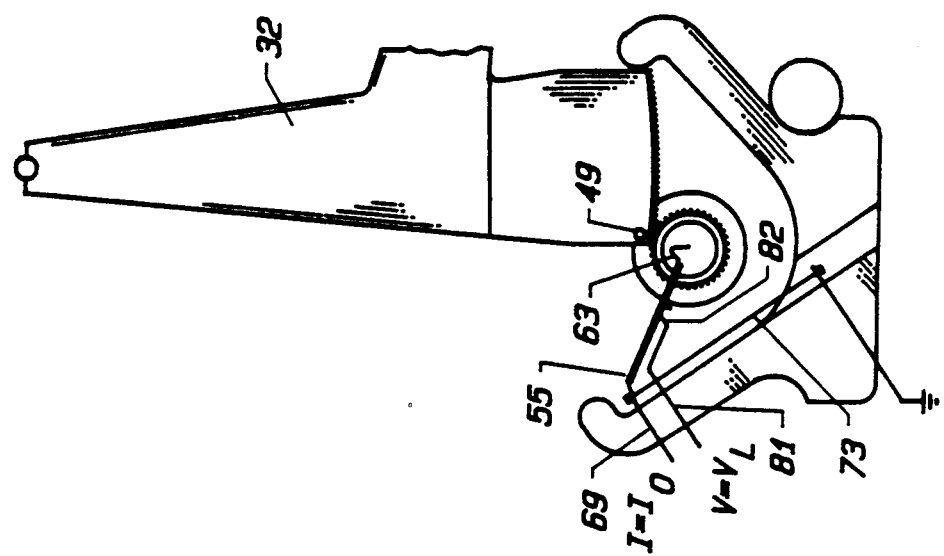
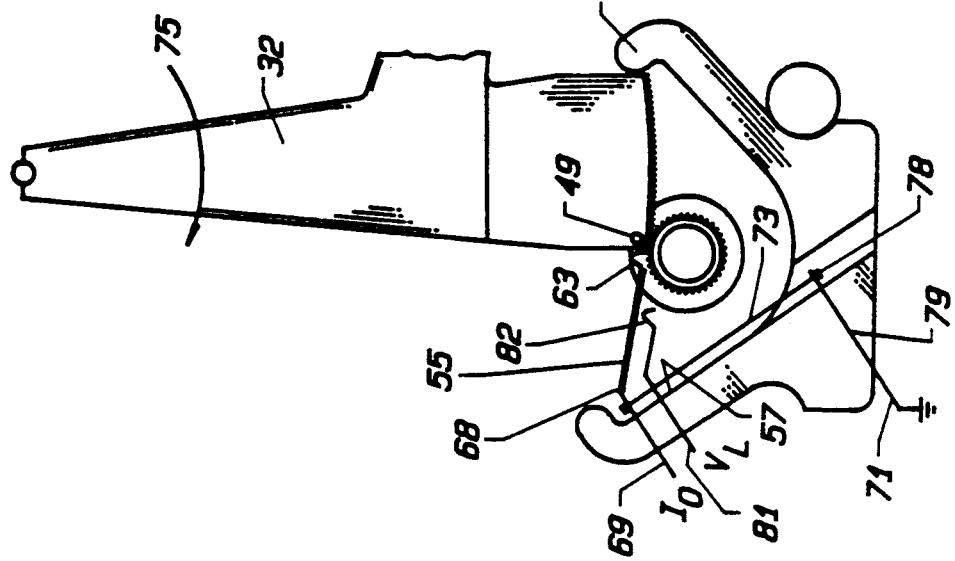

DISC DRIVE SAFETY LATCH USING SHAPE MEMORY METALS

REFERENCE TO RELATED APPLICATION

This invention is especially useful in the disc drive disclosed in the application entitled DISC DRIVE INCORPORATING AUTOMATIC WEAR COMPENSATION FOR A PIVOTED ARM, U.S. Pat. No. 4,845,579 filed Oct. 30, 1987, incorporated herein by reference. A method for moving the transducers to a designated landing zone when the drive is not in use is disclosed in U.S. Pat. No. 4,679,102 entitled, "Method and Means for Parking Read/Write Heads in a Disc Drive Using the Back-EMF of the Spindle Motor to Operate a Stepper Motor", incorporated herein by reference.

FIELD OF THE INVENTION

This invention relates to safety latches for locking a data transducer assembly against inadvertent movement across the data storage surface within a rigid disc data storage device.

BACKGROUND OF THE INVENTION

Rotating rigid disc magnetic storage devices typically use data transducers that fly on an air cushion immediately adjacent to the storage surface. The transducer is held just above the surface by an air bearing effect. This technique, widely used in presently known disc drives, is typically used in what is referred to as a Winchester disc drive.

In a Winchester disc drive, the data transducers are supported by a carriage assembly that is controllably driven to position the transducer at a predetermined landing zone on the disc storage surface when the drive is not in use. In some cases, the landing zone is located inside the innermost annular data storage track of the storage surface. In some cases, the driving mechanism may be a linear translator such as a linear voice coil solenoid. In other cases, the driver may be a stepper motor or a rotary actuator. When power is removed, the driver becomes disenabled and the back EMF of the stepper motor is used to move the transducers to the landing zone.

The disc storage surface is typically coated with very thin magnetic material which stores the recorded data for later retrieval and/or replacement. The storage surface is packed with very high data densities on the order of 10,000 bits or more per inch. The storage surface is particularly sensitive to being damaged. Any minute scratch or indentation may deform the storage surface with resultant loss of data and data storage capability at the damaged site.

The movement of a data transducer across the recording surface in the absence of the air bearing or cushion may result in damage to the storage surface from minute dents or scratches. The damage or deformity is caused because of a loading force provided to the transducer to urge it against the disc surface. This loading force is opposed to the force generated by the air bearing effect. The loading force is assigned a value which causes the transducer to come within 12 to 20 microinches of the storage surface during operation.

The storage surfaces may be dented if the transducers are susceptible to the severe complex rotational and/or translational forces sometimes encountered during unusually rough shipping and handling. As disc drives become smaller, and as they move through commerce by common carriers unaccustomed to handling delicate instruments, drives have become susceptible to storage surface damage arising from such severe handling. The most common damage occasioned by severe handling is the denting of the storage surface. Such dents are caused by severe shock forces having substantial components normal to the parallel planes of the disc surfaces. As already mentioned, such dents are known to prevent the drive from storing data at the locations thereof. If such dents occur during shipping and handling between the factory and the user, the presence will go undetected until data storage problems are encountered.

The requirement to lock the data transducer assembly of a rotating rigid disc data storage device during shipment and handling is therefore well recognized in the prior art. Four general approaches have been explored: mechanical locking devices; solenoid safety latches which are disengaged only when the drive is in operation; permanent magnetic latches which lock the assembly against movement in response to shocks below a threshold force level; and air driven safety latches that use the force of the air generated by the rotating disc to disengage the safety latch.

Manual locks are unsatisfactory because they require the intervention of an informed user. If the user is unaware of the manual lock, an attempt to use the drive may result in overload and damage to the transducer actuator. Conversely, the user must remember to engage the manual latch to prevent damage during shipment.

Solenoids are usually effective, but add cost and power consumption overhead. More significantly, they are generally larger than desired. With the progression to smaller form factor disc drives, the size of every component becomes significant.

Permanent magnets are only partially effective. They have the drawback that severe shocks to the drive will overcome the locking force leading to the infliction of the damage sought to be avoided. They also have stray magnetic fields which should be shielded from the disc.

Air driven safety latches have also been shown in the prior art, but typically require significant added time and expense to install, and require multiple parts including biasing springs and the like to maintain the latch in its proper position. Installation requires considerable mechanical skill.

A drawback of Winchester disc drives which must be accounted for is that the unit must be assembled and operated in a very clean, dust-free environment. Once assembled, the disc or discs are enclosed within a hermetically sealed housing to protect against intrusion of unfiltered ambient air. This ultra-clean environment renders impractical the use of most of the locks described above which require a number of rotating or moving parts and can easily lead to the introduction of contaminating particles into the sealed environment through extended use.

A need has therefore arisen to provide a satisfactory locking mechanism which will lock the transducer assembly in a safe position whenever severe mechanical forces or shocks might be encountered, and which will reliably release to enable normal operation of the drive when the storage discs are rotating.

SUMMARY OF THE INVENTION

A general object of this invention is to provide an improved, easily released locking mechanism for a rotating disc data storage device which effectively prevents transducer movement across data tracks during shipping and handling or at times and in situations other than when the drive is operating.

Another objective of this invention is to provide a simple, inexpensive, and very reliable locking mechanism which may be included within the sealed enclosure of a rotating rigid magnetic disc data storage device and which operates without any significant additional power consumption by using a portion of the current used to drive one of the disc drive motors when a drive is started up. This is also self-automatic locking when the power is turned off without additional power.

Another objective herein is to use the mechanical spring biasing force which returns the transducer to its storage position to lock the carriage carrying the transducer into a dead-zone position on the disc where data is not stored without the necessity of the use of electrically or mechanically actuated components to create this locking force.

These objects and advantages are achieved by providing a shape memory metal actuator latch adjacent to a rotating disc within a data storage device for automatically locking the carriage arm in its storage position when power is removed from the drive. The carriage arm is provided with a pin or casting protrusion which normally slides against or past a flexible arm mounted adjacent the carriage arm. A shape memory metal wire is attached to the flexible arm adjacent its hinged point of rotation, i.e. adjacent a point at which the arm flexes under pressure. When the disc drive is operational, the shape memory wire has power applied thereto, heating the wire past its transformation point and causing a change in phase. The resulting force applied to the arm deforms the arm around the hinge point so that the pin on the carriage arm is freed from engagement with the locking arm. When disc drive power is removed, the carriage arm and the transducer it carries are returned to the safe storage landing zone, and the pin or post is captured by the arm which returns to its unbiased position upon the removal of power from the shape memory wire.

The phenomenon of shape memory which this invention utilizes is, of course, well known. The ability to possess shape memory is a result of the fact that the shape memory alloy undergoes a reversible transformation from an austenitic state to a martensitic state with a change in temperature. An article made of such an alloy is easily deformed from its original configuration to a new configuration when cooled below the temperature at which the alloy is transformed from the austenitic state to the martensitic state. Upon cooling, the temperature at which this transformation begins is usually referred to as the $M_s$ (martensite start) temperature and the temperature at which this transformation is complete is the $M_f$ (martensite finish) temperature. When an article thus deformed is warmed to the temperature at which the alloy starts to revert back to austenite, referred to as the $A_s$ (austenite start) temperature, the deformed object will begin to return to its original configuration. The reversion of the alloy will be complete upon reaching the $A_f$ (austenite finish) temperature. A considerable force will be exerted with this change in state from martensitic state to austenitic state.

The shape memory alloys that have been used with the above actuators are usually either copper-based or nickel/titanium-based. These alloys are well known to those skilled in the art.

The foregoing and other objects and advantages and features of this invention will become apparent from consideration of the following description of a preferred embodiment presented in conjunction of the accompanying drawings.

BRIEF DESCRIPTION OF THE DRAWINGS

FIGS. 3A-3C show schematically the operation of the preferred embodiment of the carriage lock.

DETAILED DESCRIPTION OF A PREFERRED EMBODIMENT

Figure 2:
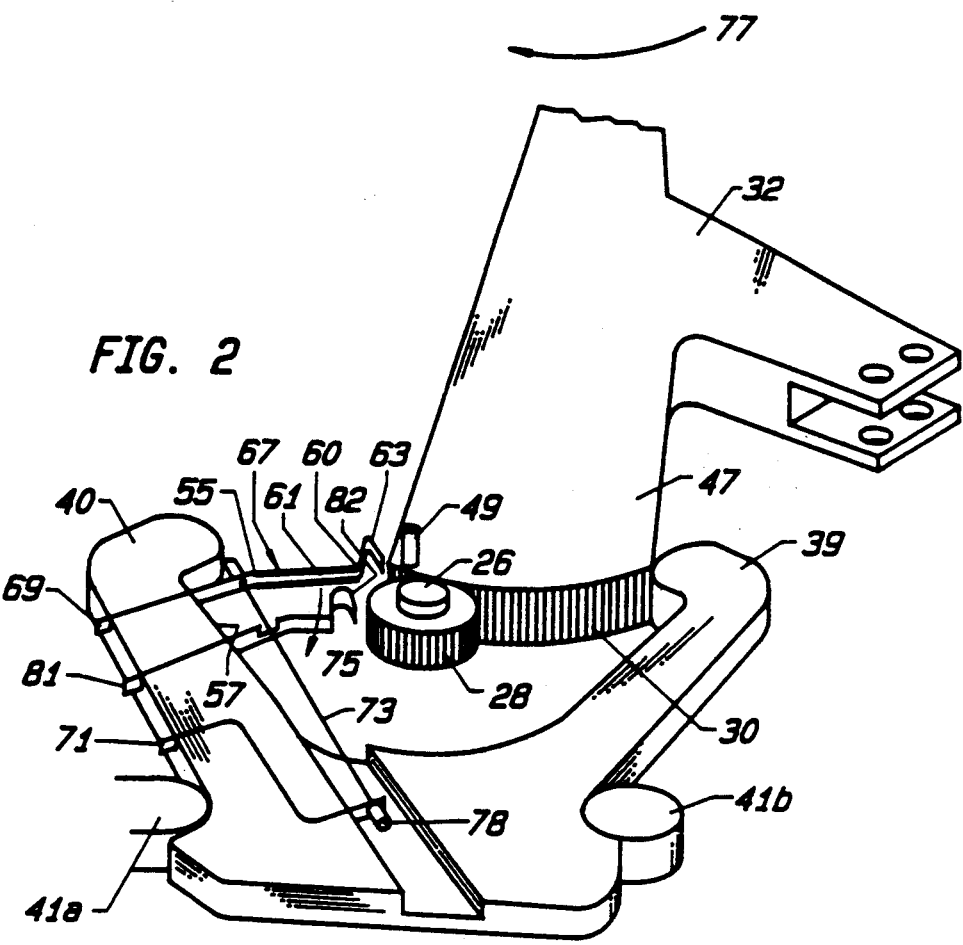
FIG. 2 is an isometric assembly drawing of a rotating data disc storage device incorporating the transducer lock of this invention mounted atop the carriage arm stop assembly.

A preferred embodiment of this invention is most clearly depicted in FIG. 2. Other embodiments and variations will suggest themselves to those skilled in the art without departing from the spirit and scope of this invention.

Figure 1:
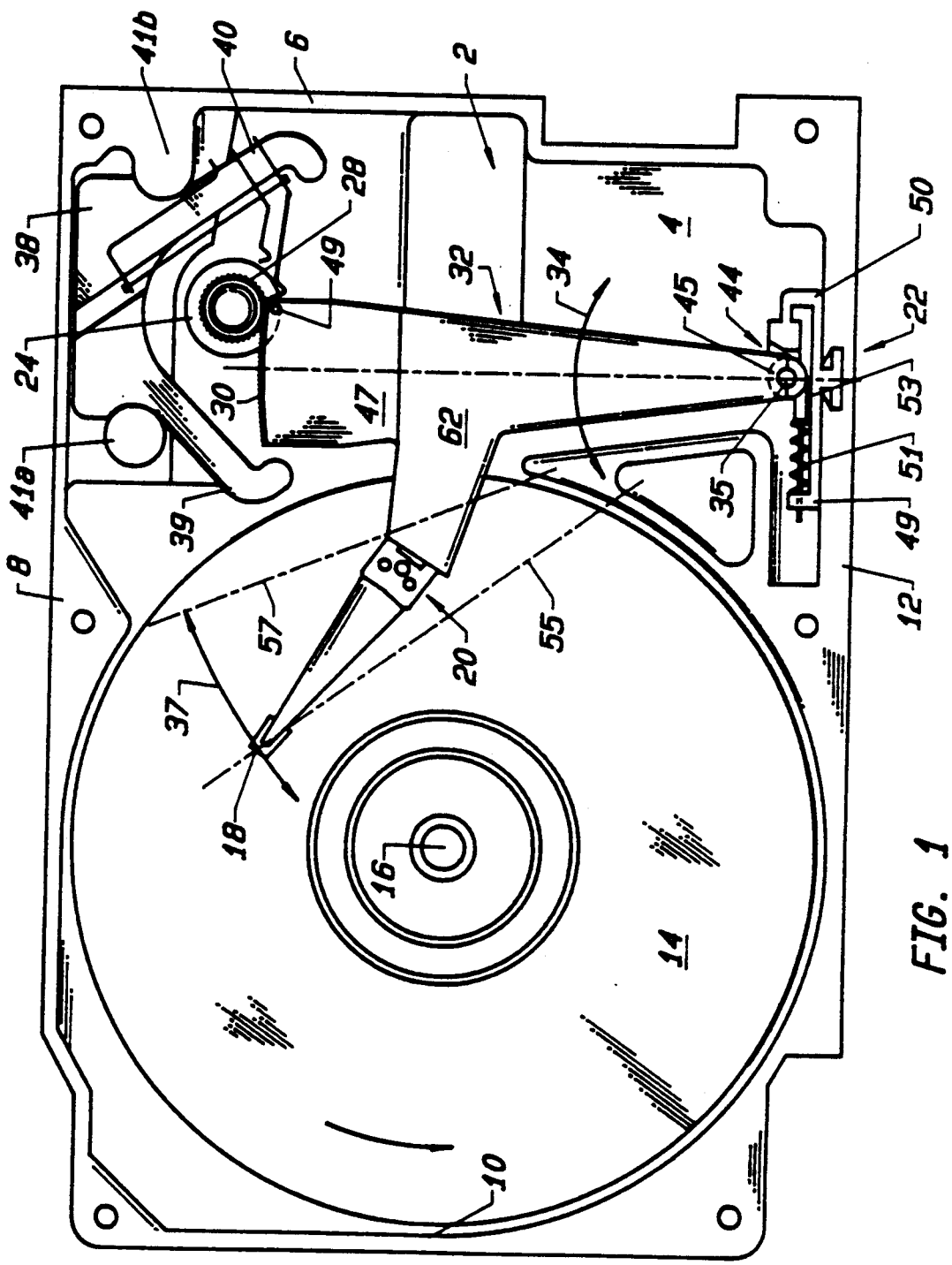
FIG. 1 is a top plan view of a disc drive which may be adapted to incorporate a carriage lock incorporating the principals of this invention.

Referring first to FIG. 1, the major elements of the disc drive are shown including a housing 2 including a baseplate 4 and upright walls 6, 8, 10 and 12.

One or more data storage discs 14 are mounted within the housing 2 for rotation on a spindle 16. A transducer 18 is provided for reading and writing data on the disc 14. The transducer 18 is positioned using a head actuator arm assembly combination generally indicated at 20.

The arm assembly 20 pivots around a biasing mounting spring 22 in response to rotation of a stepper motor (not shown) which is mounted beneath the baseplate 4 with a shaft 26 extending up through the baseplate 4. The motor shaft 26 has a pinion 28 machined thereon to mesh with gear teeth 30 on the end of actuator arm 32. Therefore, it is clear that rotation of the motor 28 across the face of the gear sector 30 causes movement of the arm assembly 20 generally along the arc defined by arrow 34. As the actuator arm 32 moves, it pivots about a theoretical pivot point 35 to move the transducer head 18 from track to track on the surface of the disc 14.

The essential elements of the supporting assembly 22 are also seen in FIG. 1. The biasing support 50 functions to maintain the alignment of the actuator arm 32 with the stepper motor 26. The pin 44 is captured in a "V" shaped holder 45 carried on the end of the actuator arm 32. The opposite end or head position 47 of the actuator arm 32 is pressed against the pinion 28. A biasing spring 49 is provided slidable along a rod 51 and butting up against a wedge 53 which is forced behind the pin 44. This spring arrangement maintains contact between the actuator 32 and the pinion 28. It combines with the spring force of the arm 50 to cause the arm 32 to rotate to its home position, illustrated in FIGS. 1 and 2 when power is removed from the stepper motor 28. This home position of the actuator arm carries the transducer 18 to a landing position inside the innermost track on the surface of the disc 14, i.e. over a non-data storing "dead zone".

As is disclosed in the above-incorporated application and is shown in FIGS. 1 and 2, a crash stop 38 is provided mounted on pins 41A and 41B incorporated in the housing and base casting and including a pair of arms 39, 40 supported on either side of the stepper motor shaft 26. The arms 39 and 40 are positioned to capture the head portion of the actuator arm before it can exceed its permitted length of travel. The crash stop comprises a plastic element captured on the pins 41A, 41B which rise out of the base casting near the ends of the arms 39 and 40.

As appears most clearly in FIG. 2, a modification of the plastic arm of the crash stop has been made to incorporate a spring biased arm 55 which is pivotable about a pivot point located approximately at 57 where the spring 55 exits the crash stop end 40. The spring 55 is made of quality metal spring material and either pressed or molded into the crash stop end 40. A pin or casting protrusion stop 49 is formed on the top surface of the actuator arm 47 very near the end face 30 of the arm 47 and adjacent the pinion 28 which drives the arm 47 back and forth.

The opposite end 61 of this spring loaded arm 55 includes an end portion 63. The length of the arm 55 is chosen so that during positioning operations of the actuator arm 32, the pin 49 moves freely behind the rear surface 67 of the biasing arm 55 as clearly shown in FIG 2B. When the heads are to be moved from the park position, power is applied to wire 73, withdrawing end portion 63 from its position adjacent stop 49 so that stepper motor 24 can move the heads, and thereby pin 49 from position A to position B. As the heads are moved across the data tracks, the pin 49 moves between positions B and C. However, when power is removed from the drive, the actuator arm 32 is driven to its home position to move the transducer 18 to a safe landing zone or park position displaced from any of the data tracks on the surface of the disc. When the arm 32 reaches this park position, the pin 49 carried on the arm 32 slides past the extended finger 63 on the end of the locking arm 55. Once it slides past this extended finger 63, it is captured behind it and the actuator arm 32 and especially the head portion thereof is captured between the crash stop arm 39 and finger 63 of locking arm 55 as shown in FIG. 2. When the drive is restarted, power is applied through the lines 69, 71 to the shape memory wire element 73 to retract the locking arm 55 and finger 63 to again allow free movement of arm 47.

This shape memory effect is based on the martensitic transformation will be explained hereinunder. A shape memory alloy, such as a Ti-Ni alloy, has the strong austenitic structure at a temperature above its transformation point starting at $A_s$ upon heating. This phase is transformed into the weak martensitic phase at a temperature lower than the transformation point starting at $M_s$ upon cooling, so that the alloy is easily deformed by the application of an external small force. When the alloy is heated to a temperature above the transformation point again, the martensitic phase transforms to the former austenitic phase (inverse transformation) according to a given ordered crystalline orientation law. The alloy has the property of offering an exceedingly large recovery force when returning to the austenitic phase.

The employment of a resilient force as a bias force for deformation of the martensitic-phase alloy at a low temperature permits the alloy to effect a reversible operation with a heat cycle.

In this particular configuration, the shape memory alloy element 73 responds to the application of power by resistively heating the element 73 to change from one of the martensitic or austenitic conditions to the other, and cooperates with the spring arm 55 to elastically deform the arm 55 from an undeformed to a deformed position. In this way, the arm 55 and especially the restraining finger 63 is withdrawn in the direction of the arrow 75 from a position adjacent the pin 49. The actuator arm 32 is now free to move in the direction indicated by the arrow 77 as propelled by the pinion 28 in response to actuation from the stepper motor that drives the pinion 26.

The power which flows through the wires 69, 71 to cause a change in state of the shape memory alloy 73 can be conveniently provided from the same source used to power the spindle motor that drives the disc for constant rotation so long as the discs are rotating.

In this specific embodiment shown in FIG. 2, the shape memory alloy wire 73 is in the martensitic condition and thus is in its weakened state. The resilient arm 55 is designed so that it can overcome the strength of the shape memory alloy element 73 to reach the position shown in the figure. Since the shape memory alloy element 73 cannot restrain the movement of the arm 55 in its martensitic state, the resilient arm 55 contacts the pin 65 and holds it in place.

When the shape memory alloy wire 73 has power applied thereto by current flow, it is transformed to its austenitic condition. The transformation occurs due to heating by resistance of the shape memory alloy wire 73. The heating occurs in response to the current flow created when the power to the disc drive is turned on.

When the shape memory alloy wire 73 is in the resulting austenitic condition, the resilient arm 55 is deformed away from the pin 49. This occurs because when the shape memory alloy element goes through the elastic transformation from martensitic phase to austenitic phase, the elements' dimensions change from the lengthened deformed state shown in FIG. 2 to the shortened undeformed state. Further, when the shape memory alloy is in the austenitic condition, it has greater strength than the resilient arm 55; accordingly, the wire 73 is able to pull the resilient arm 55 away from the pin 49. This deformed position of the arm 55 allows the pin 49 to move behind head portion 60 of arm 55 and move freely behind the back surface 67 of the resilient arm 55 as the pinion moves the arm from point to point. When power to the wire 73 motor is removed, the wire cools and returns to its martensitic phase. In summary, the arm 55 and the shape memory alloy wire 73 work in opposition to one another so that unless the resilient arm 55 is somehow restrained by the shape memory alloy element, the head portion 60 of the resilient arm 55 will capture the pin 49 on the actuator arm 32 when the arm reaches the zero position. The arm 32 will be held with its transducer in the unloaded position relative to the disc until the spindle motor power is restored.

Figure 2A:
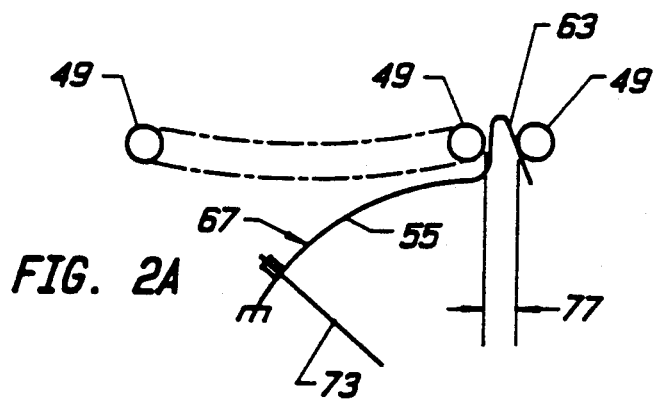
FIG. 2a shows schematically the lock in a power off position.

FIG. 2A shows the shape and position of biasing arm 55 in the martensitic phase (power off) such that it does not interfere with pin 49 during normal operation of the drive between its inner and outer data tracks. Mathematically, the extent 77 of end portion 63 must be less than the distance moved by pin 49 from the innermost data track to the parking or locking position.

An optional resilient metallic contact arm 81 makes contact with arm 55 where it is in the retracted (deformed) position at point 82. Since power is applied to arm 55 to actuate element 73, a voltage is present at contact arm 81 when arm 55 is properly retracted, thereby giving the disc controller electronics an indication that it is safe to move arm 32.

FIGS. 3A-3C show schematically the operation of the latch at start-up and power-down.

Figure 4:
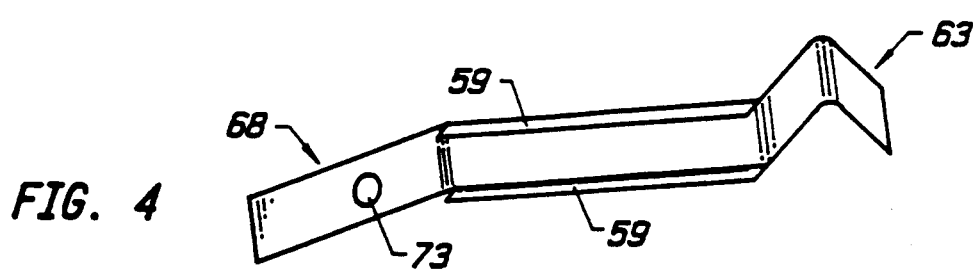
FIG. 4 is a perspective view of a spring arm of the carriage of this invention.

FIG. 3A shows the status of the latch of this invention with drive power off. Arm 32 is securely locked between the end 63 of spring arm 55 and crash stop end 39. In practice, arm 32 may be capable of minute movements because it is not tightly secured, but in no case will it be capable of moving into a data area to the left of spring end 63. Spring 55 is made of high quality spring material which will easily conduct electricity to SMA wire 73. Beryllium copper or phosphor bronze are typical examples, although other materials may be substituted. this spring bends (flexes) at point 57, but is usually more rigid between points 68 where the SMA wire 73 is attached and spring end 63. This can be done, for example, by bending the sides of spring arm 55 to form wings to give it more stiffness as shown in FIG. 4. Arm 32 is securely prevented from moving in direction 75 because its action on spring arm 55 is predominantly in a compression mode; hence it is extremely difficult to move. In contrast, at power on, the action of SMA wire 73 on spring arm 55 is predominantly in a bending mode and therefore arm 55 is extremely easy to move.

SMA wire 73 is connected to spring arm 55 at point 68 and to a base arm 79 at point 78. Base arm 78, which is typically supported from the crash stop 38, is generally rigid and inflexible, but can also be somewhat flexible to provide an overload mechanism to prevent damage to the SMA wire 73 in the event of a jam. Both good mechanical and electrical contact must be made between SMA wire 73 at its attachments 68 and 78. This can be done in many ways known to people skilled in the art; however, one preferred embodiment is to mechanically crimp to the ends of SMA wire 73 and subsequently solder to arms 55 and 79.

Contact arm 81, which is a generally inflexible arm, provides a means of indicating when spring arm 55 is fully deformed to the unlatched position as a voltage will be present on this contact when this status occurs. This will give a voltage to the drive electronics indicating the latch is out of the way, and arm 32 can now be safely moved.

Arms 55, 81 and 79 can either be molded into crash stop 38, or can be subsequently pressed into position as an assembly after SMA wire 73 has been properly attached.

FIG. 3B shows initial power supplied to SMA wire 73 during the start-up phase. Spring end 63 is pulled away from pin 49 removing it as an obstruction, and contact of spring arm 55 is made with contact arm 81 at end 82, giving an indication that the latch is unlocked and arm 32 is free to move at will in response to rotation of stepper motor 24.

FIG. 3C shows arm 32 in different desired positions to address data on the disc. Power is now off on SMA wire 73, and spring arm 55 stretches SMA wire 73, now in the weak martensitic phase, back to its original shape. There is, of course, no voltage on contact arm 81.

When it is desired to turn off the drive, arm 32 is directed to its park position shown in FIG. 3A. When pin 49 makes contact with the sloped side of spring arm end 63, it easily bends it downward and proceeds past the end. Operation in this manner therefore requires no power and is automatic. If there is an unnatural concern about debris being generated by the rubbing action of pin 49 on arm end 63 during this power-down phase, SMA wire 73 can be re-energized (with power generated from the back EMF of the spindle motor as it slows down, for example) and the spring arm retracted as during the start-up phase.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. In a data storage device including a frame and one or more rotating discs, at least one data transducer positioned in close proximity to a major surface of each said disc which has a data storage region comprising a plurality of adjacent data storage tracks for writing and reading data on said surface and a rest position for its respective transducer, a transducer supporting arm for supporting and moving each said data transducer relative to said surface, and drive means for moving said arm;

an improved safety latch for locking each said transducer at said rest position in the absence of disc rotation comprising a flexible spring arm mounted horizontally adjacent said transducer supporting arm, and a shape memory alloy element operatively connected between said frame and said flexible arm, said shape memory alloy element having a martensitic phase and an austenitic phase, said shape memory alloy element in one of the martensitic and austenitic conditions cooperating with said flexible arm to elastically deform said flexible arm to allow said transducer supporting arm to position said transducer relative to said disc, said shape memory alloy element in the other of the martensitic and austenitic conditions operating in a tensile mode and cooperating with the flexible arm to capture said transducer supporting arm and hold each said transducer at said rest position, and bias means for actively causing said shape memory alloy to change from said martensitic to said austenitic condition.

2. The improved safety latch as claimed in claim 1 wherein said data storage device includes a spindle motor for rotating each said disc at a constant speed and a power supply for said spindle motor, said bias means being supplied with current by said power supply so that said shape memory alloy changes from one to the other of said martensitic and austenitic conditions with activation of said spindle motor.

3. The improved safety latch as claimed in claim 1 wherein the shape memory alloy in the martensitic condition deforms said flexible arm relative to said transducer supporting arm to allow free movement of said transducer supporting arm.

4. The improved safety latch as claimed in claim 3 wherein said flexible spring arm is supported from said frame and extends along the path of travel of said transducer supporting arm from a point opposite said rest position of each said transducer so that said transducer supporting arm is forcibly restrained against travel away from said rest position until said bias means actively changes the condition of said shape memory alloy element and withdraws said flexible spring arm.

5. The improved safety latch as claimed in claim 4 wherein said flexible arm is mounted adjacent to and cantilevered over said transducer supporting arm, said transducer supporting arm being captured and held at a position adjacent the data storage region of said major surface.

6. The improved safety latch as claimed in claim 5 wherein said flexible spring arm is rotatable about a point adjacent a point at which it is mounted, said shape memory alloy element being attached to said flexible arm at a point intermediate said point of rotation and an end of said flexible spring arm which captures said transducer supporting arm, activation of said biasing means causing said shape memory alloy element to change condition and said flexible arm to rotate away from said transducer supporting arm to allow free movement of said transducer supporting arm.

7. The improved safety latch as claimed in claim 6 wherein said shape memory alloy element has one end fixedly supported from said frame and the other end attached to said flexible arm, actuation of said biasing means causing said shape memory alloy element to change from said austenitic condition to said martensitic condition, the fixed end of said flexible arm establishing a center of rotation for said flexible arm whereby said flexible arm is rotated by said shape memory alloy element away from said transducer supporting arm.

8. The improved safety latch as claimed in claim 7 wherein said transducer supporting arm includes a pin protrusion stop extending above the top surface of the transducer supporting arm, said cantilevered flexible arm including a head portion which contacts and captures said pin protrusion stop to hold said transducer supporting arm with each said data transducer in said rest position until the biasing means are actuated, actuation of said biasing means causing rotation of said flexible arm and the head portion of said flexible arm away from said protrusion stop to allow free movement of said transducer supporting arm.

9. In a data storage device including a frame, a housing secured thereto, one or more rigid rotating discs wherein each said disc includes a plurality of data storage tracks defining a data storage region on the major surface of said disc and having a predetermined landing zone for a respective data transducer adjacent to said data storage region, a transducer support arm for supporting and moving each said data transducer relative to its respective surface, an improved safety latch for locking each said transducer at the respective landing zone in the absence of disc rotation under the influence of a spindle motor supporting and constantly rotating each said disc when said data storage device is in use and for releasing each said transducer in response to electrical activation of said spindle motor, said latch comprising a flexible arm mounted on said housing at a point adjacent said transducer support arm and cantilevered over the area of movement of said transducer support arm, and a shape memory alloy element operatively connected between said frame and said flexible arm, said shape memory element having a martensitic phase and an austenitic phase and operating in a tensile mode, said shape memory alloy element in said austenitic phase cooperating with said flexible arm to allow said flexible arm to capture said transducer support arm to position each said transducer over its respective landing zone, said shape memory alloy element in the martensitic condition cooperating with the flexible arm to elastically deform said flexible arm away from said transducer support arm to allow said transducer support arm to move freely relative to each said disc to position each transducer over selective data access positions on the respective disc, and bias means for actively causing said shape memory alloy element to change from said martensitic condition to said austenitic condition.

10. The improved safety latch as claimed in claim 9 wherein said data storage device spindle motor includes a power supply for causing constant rotation of said spindle motor during use of said disc drive, said bias means being supplied with current by said power supply to cause said shape memory alloy element to change state from said austenitic phase to said martensitic phase with activation of and constantly during use of said spindle motor to rotate each said disc in said data storage device.

11. The improved safety latch as claimed in claim 10 wherein said flexible arm is supported from said frame and extends along the path of travel of said transducer support arm from a point opposite said rest position of each said transducer so that said transducer support arm is forcibly restrained against travel away from said rest position when said bias means is not actively changing the condition of said shape memory alloy element.

12. The improved safety latch as claimed in claim 9 wherein said flexible arm is rotatable about a point adjacent a point at which a fixed end of said flexible arm is mounted, said shape memory alloy element being attached to said flexible arm at a point intermediate said point of rotation and an end of said flexible arm which captures said transducer support arm, activation of said biasing means causing said shape memory alloy element to change condition and said flexible arm to rotate away from said transducer support arm to allow free movement of said transducer support arm.

13. The improved safety latch as claimed in claim 12 wherein said shape memory alloy element has one end fixedly supported from said frame and the other end attached to said flexible arm, actuation of said biasing means causing said shape memory alloy element to change from said austenitic condition to said martensitic condition, the fixed end of said flexible arm establishing a center of rotation for said flexible arm whereby said flexible arm is rotated by said shape memory element away from said transducer support arm.

14. The improved safety latch as claimed in claim 13 wherein said transducer support arm includes a protrusion stop extending above the top surface of the transducer support arm, said cantilevered flexible arm including a head portion which contacts and captures said pin protrusion stop to hold said transducer support arm with each said data transducer in its respective rest position when the biasing means are not actuated, actuation of said biasing means causing rotation of said flexible arm and the head portion of said flexible arm away from said protrusion stop to allow free movement of said transducer support arm.

15. The improved safety latch as claimed at claim 14 including a contact arm cantilevered adjacent said flexible arm, movement of said flexible arm bringing said flexible arm into contact with said contact arm, and means responsive to said contact to indicate that said transducer support arm is freed to move.

* * * * *